(12) United States Patent
Gorski

(10) Patent No.: US 7,959,390 B2
(45) Date of Patent: Jun. 14, 2011

(54) VEHICLE TRUNK ORGANIZER

(76) Inventor: Tom Gorski, Carol Stream, IL (US)

( * ) Notice: Subject to any disclaimer, the term of this patent is extended or adjusted under 35 U.S.C. 154(b) by 166 days.

(21) Appl. No.: 12/290,905

(22) Filed: Nov. 5, 2008

(65) Prior Publication Data

US 2010/0111635 A1    May 6, 2010

(51) Int. Cl.
*B60P 7/135* (2006.01)
*B60R 7/02* (2006.01)

(52) U.S. Cl. ........................................... 410/121

(58) Field of Classification Search ............... 410/117, 410/118, 120, 121; 296/37.5, 37.8, 37.16; 211/12, 71.01, 195, 168, 169, 201; 224/42.33, 224/42.34, 539, 542, 548, 549, 550, 551, 224/552, 553, 554
See application file for complete search history.

(56) References Cited

U.S. PATENT DOCUMENTS

| | | | | |
|---|---|---|---|---|
| 1,489,527 A * | 4/1924 | Henry | | 220/6 |
| 1,754,555 A * | 4/1930 | Hall | | 224/42.34 |
| 3,404,818 A * | 10/1968 | Miscoe | | 224/42.34 |
| 3,410,328 A * | 11/1968 | Hideo | | 220/9.2 |
| 4,029,244 A * | 6/1977 | Roberts | | 224/42.34 |
| 4,056,220 A * | 11/1977 | Trimble | | 224/406 |
| 4,538,737 A * | 9/1985 | Delaney | | 211/71.01 |
| 4,718,584 A * | 1/1988 | Schoeny | | 224/42.34 |
| 5,052,580 A | 10/1991 | Khoury | | |
| 5,161,700 A * | 11/1992 | Stannis et al. | | 211/175 |
| 5,163,569 A * | 11/1992 | Buff | | 211/201 |
| 5,215,205 A | 6/1993 | Behlman | | |
| 5,234,116 A * | 8/1993 | Kristinsson et al. | | 211/201 |
| 5,282,592 A * | 2/1994 | Ma | | 248/150 |
| 5,299,721 A * | 4/1994 | Cummings | | 224/406 |
| 5,379,906 A | 1/1995 | Levin et al. | | |
| 5,603,439 A * | 2/1997 | Pineda | | 224/403 |
| 5,667,120 A * | 9/1997 | Bieck et al. | | 224/542 |
| 5,715,978 A * | 2/1998 | Ackeret | | 224/42.33 |
| 5,772,058 A | 6/1998 | Staesche | | |
| 6,105,654 A * | 8/2000 | Martel | | 160/135 |
| 6,644,712 B1 | 11/2003 | Rafi-Zadeh | | |
| 6,796,472 B2 * | 9/2004 | Miller | | 224/539 |
| 6,938,807 B2 | 9/2005 | Victor | | |
| 7,004,698 B1 * | 2/2006 | Salazar | | 410/118 |
| 2003/0111503 A1 * | 6/2003 | Miller | | 224/539 |
| 2004/0118854 A1 | 6/2004 | Kutun | | |
| 2004/0211805 A1 * | 10/2004 | Victor | | 224/497 |
| 2007/0187969 A1 | 8/2007 | Dowd et al. | | |
| 2007/0241154 A1 | 10/2007 | Potts et al. | | |

FOREIGN PATENT DOCUMENTS

GB    2 249 767 A    5/1992

* cited by examiner

*Primary Examiner* — H Gutman
(74) *Attorney, Agent, or Firm* — Henry C. Query, Jr.

(57) ABSTRACT

A vehicle trunk organizer includes at least two elongated, generally parallel strut members and at least two elongated, generally parallel cross-piece members. Each strut member comprises at least one longitudinal opening formed therein, and each cross-piece member comprises at least one elongated beam member which extends through the opening in each strut member. The beam members are pivotally connected to the strut members to enable the trunk organizer to be collapsed from an unfolded state to a folded state. In the unfolded state the trunk organizer comprises a generally rectangular lattice configuration which defines a number of individual compartments within which items to be transported may be placed.

14 Claims, 2 Drawing Sheets

VEHICLE TRUNK ORGANIZER

BACKGROUND OF THE INVENTION

The present invention is directed to an organizer for separating and stably holding items in the trunk of a vehicle. In particular, the invention is directed to a trunk organizer which in its unfolded state comprises a generally rectangular lattice configuration that defines a number of separate compartments within which the items may be placed, and which is collapsible from the unfolded state to a folded state for storage when not in use.

Many types of vehicle trunk organizers may be found in the prior art. However, these trunk organizers typically either comprise fixed, non-collapsible configurations of rigid panel members or collapsible arrangements of relatively flimsy panel members. The non-collapsible trunk organizers are of limited use in vehicles of varying trunk sizes. Also, although some of these trunk organizers may be reconfigured for different sized trunks, this process is inconvenient and time consuming. The collapsible trunk organizers are better able to fit within trunks of varying sizes. However, their flimsy panels are often ineffective in firmly holding heavy or irregularly shaped objects in place.

Therefore, what is needed is a trunk organizer which comprises a collapsible arrangement of rigid panel members to more effectively and firmly hold various items in place within the vehicle's trunk.

SUMMARY OF THE INVENTION

In accordance with the present invention, these and other limitations in the prior art are overcome by providing a vehicle trunk organizer which includes at least two elongated, generally parallel strut members, each of which comprises at least one longitudinal opening formed therein; at least two elongated, generally parallel cross-piece members, each of which comprises at least one elongated beam member which extends through the opening in each strut member; and means for pivotally connecting each beam member to each strut member to thereby enable the trunk organizer to be collapsed from an unfolded state to a folded state. In the unfolded state the trunk organizer comprises a generally rectangular lattice configuration which defines a number of individual compartments within which items to be transported may be placed.

In accordance with another aspect of the invention, the trunk organizer may also comprise means for effectively extending the length of at least one of the strut members or at least one of the cross-piece members. The extending means may comprise, for example, a generally flat plate member which is slidably mounted to an end of the strut member or the cross-piece member. In addition, the plate member may comprise an elongated arm portion and a transverse head portion, and the bottom of the head portion may lie on the same horizontal plane as the bottom of the strut members to thereby increase the horizontal stability of the trunk organizer.

Thus, the vehicle trunk organizer of the present invention provides a simple but effective means for organizing and stably holding a variety of items in the vehicle's trunk. Since the strut and cross-piece members are rigid, each compartment of the trunk organizer is effective in holding heavy and irregularly shaped objects. However, since the strut and cross-piece members are pivotally connected to each other, the trunk organizer can be partially collapsed to fit in variously sized trunks or completely collapsed for storage. Furthermore, since the trunk organizer has means for effectively extending the lengths of the strut or cross-piece members, the trunk organizer can easily conform to large, wide or deep trunks.

These and other objects and advantages of the present invention will be made apparent from the following detailed description, with reference to the accompanying drawings.

DETAILED DESCRIPTION OF THE INVENTION

Figure 1:
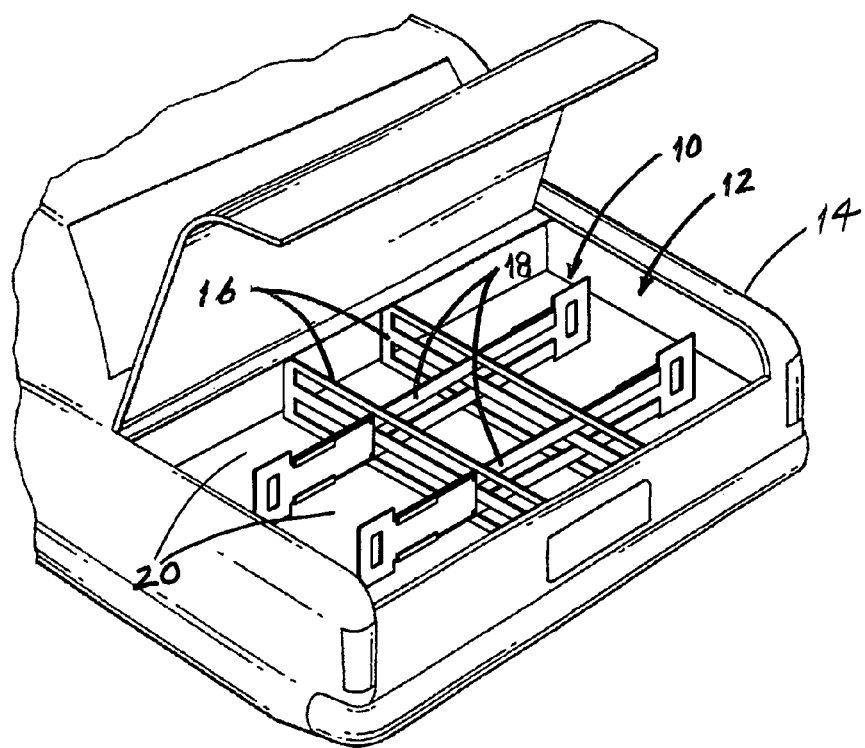
FIG. 1 is a perspective view of an embodiment of the trunk organizer of the present invention shown positioned in the trunk of a vehicle.

Referring to FIG. 1, the trunk organizer of the present invention, which is indicated generally by reference number 10, is shown positioned in the trunk 12 of an exemplary vehicle 14. In a preferred embodiment of the invention, the trunk organizer 10 comprises at least two elongated, generally parallel strut members 16 and at least two elongated, generally parallel cross-piece members 18. The strut members 16 are connected to the cross-piece members 18 in such a manner that, in the unfolded state of the trunk organizer depicted in FIG. 1, these members form a generally rectangular lattice structure which defines a number of individual compartments 20 within which items such as groceries and the like may be placed to keep them organized and stable.

Figure 2:
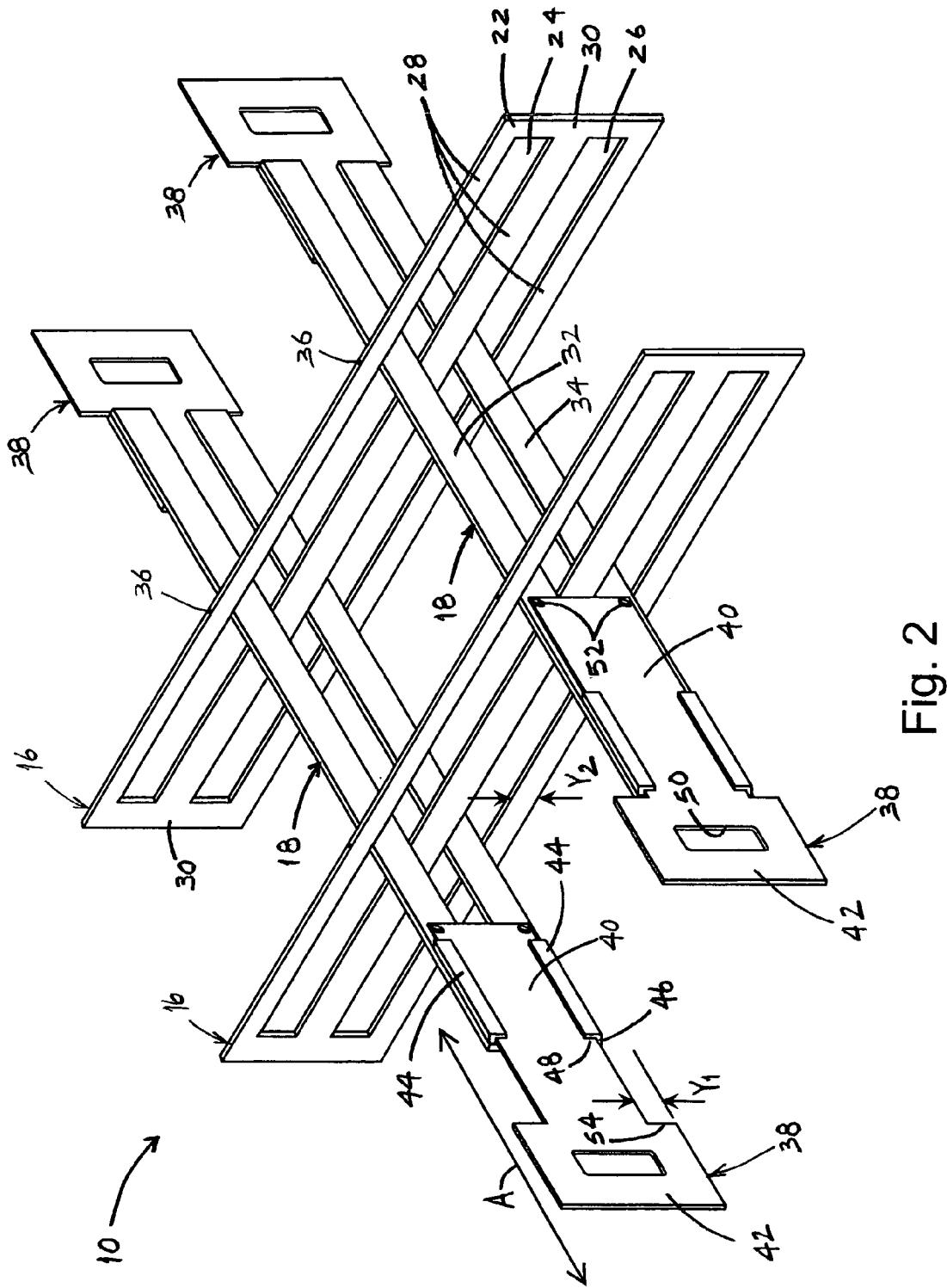
FIG. 2 is a perspective view of the trunk organizer of FIG. 1 shown in its unfolded state.

Referring to FIG. 2, each strut member 16 ideally comprises a rigid, generally flat panel member 22 within which at least one and preferably two longitudinal, generally parallel openings 24, 26 are formed. In this embodiment of the invention, each panel member 22 is shown to comprise three horizontal stretchers 28 which are connected together by two transverse end joints 30 in a spaced-apart, generally parallel configuration to thereby define the openings 24, 26.

Each cross-piece member 18 is comprised of preferably two rigid beam members 32, 34. As shown in FIG. 2, the upper beam member 32 of each cross-piece member 18 is inserted through the upper opening 24 in each strut member 16. Similarly the lower beam member 34 of each cross-piece member 18 is inserted through the lower opening 26 in each strut member 16. Thus, the ends of the beam members 32, 34 extend beyond the panel members 22 such that the strut members 16 and the cross-piece members 18 will together form a generally rectangular lattice structure. The upper and lower beam members 32, 34 of each cross-piece member 18 are ideally aligned in the same plane, but they need not be connected to each other.

Figure 3:
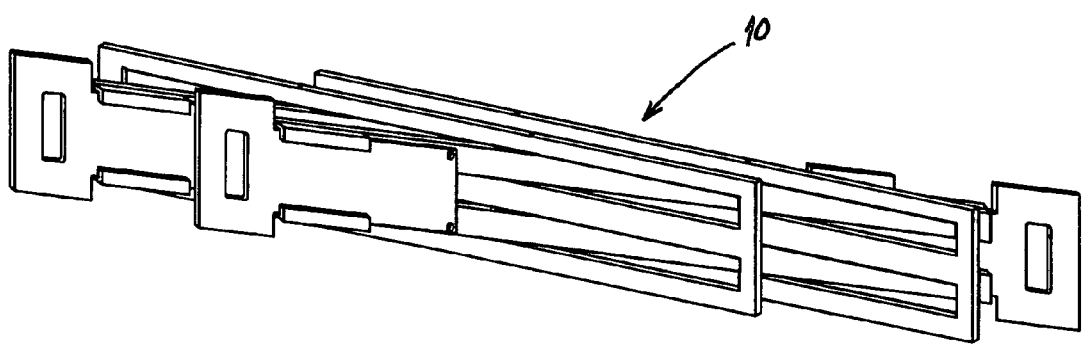
FIG. 3 is a perspective view of the trunk organizer of FIG. 1 shown in its folded state.

Prior to being connected together, the strut members 16 are positioned parallel to each other and the cross-piece members 18 are positioned parallel to each other. The beam members 32, 34 of each cross-piece member 18 are then pivotally connected to each strut member 16 by suitable means, such as a pin 36, which is received in corresponding aligned holes extending through the stretchers 28 and the beam members. In this manner, the trunk organizer 10 is collapsible from the unfolded state shown in FIG. 2 to the folded state shown in FIG. 3 to allow the trunk organizer to be stored when not in use.

In accordance with one aspect of the present invention, the trunk organizer 10 may be provided with means for effectively extending the length of the strut members 16 and/or the cross-piece members 18 to enable the trunk organizer to conform to deep an/or wide trunks. For example, as shown most clearly in FIG. 2, the trunk organizer 10 may comprise a number of generally flat plate members 38, each of which is movably mounted to a corresponding end of the cross-piece members 18. Each plate member 38 preferably includes an elongated, generally rectangular arm portion 40 and a transverse, generally rectangular head portion 42. The arm portion 40 ideally comprises a height which is approximately equal to the height of the cross-piece member 18, and the head portion 42 ideally comprises a height which is greater than the height of the arm portion.

The arm portion 40 is slidably supported on the cross-piece member 18 by a pair of brackets 44, each of which includes an first portion 46 which is connected to the cross-piece member by suitable means, such as screws (not shown), and a transverse second portion 48 which together with an adjacent portion of the cross-piece member forms a channel within which a corresponding edge of the arm portion is received. In this manner, the plate member 38 may be moved in the direction of the arrow A from its normal retracted position to an extended position to thereby effectively increase the length of the cross-piece member 18.

If desired, a hand opening 50 may be provided in the head portion 46 to facilitate extending and retracting the plate member 42. In addition, one or more stops 52 may be attached to the end of the arm portion 40 to limit the amount of travel of the plate member 32 relative to the cross-piece member 18.

Referring still to FIG. 2, each plate member 32 ideally comprises a lower shoulder 54 at the intersection of the arm portion 40 with the head portion 42. The height $Y_1$ of the shoulder 54 is ideally approximately equal to the height $Y_2$ of the lower stretcher 28. In this manner, the bottoms of the arm portions 40 will lie on the same horizontal plane as the bottoms of the strut members 16 to thereby stabilize the trunk organizer 10 in the horizontal plane and prevent it from tipping.

It should be apparent to the person skilled in the art that many variations of the trunk organizer 10 may be made to suit a particular need. For example, more than two strut members 16 and/or more than two cross-piece members 18 may be employed to achieve a desired size and shape of the trunk organizer 10. In addition, the strut members 16 may comprise a single longitudinal opening and the cross-piece members 18 may comprise a single beam member in order to simplify the construction of the trunk organizer.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

I claim:

1. A vehicle trunk organizer for organizing items in a trunk of a vehicle, the trunk organizer comprising:
    at least two elongated, generally parallel strut members, each of which comprises a bottom edge and at least one longitudinal opening;
    at least two elongated, generally parallel cross-piece members, each of which comprises at least one elongated beam member which extends through the opening in each strut member;
    a connector which pivotally connects each beam member to each strut member to thereby enable the trunk organizer to be collapsed from an unfolded state to a folded state;
    wherein in the unfolded state the trunk organizer comprises a generally rectangular lattice configuration which defines a number of individual compartments within which the items may be placed; and
    means for effectively extending the length of at least one of the strut members or at least one of the cross-piece members;
    wherein the extending means comprises a generally flat plate member which is slidably mounted to an end of the strut member or the cross-piece member.

2. The trunk organizer of claim 1, wherein the plate member comprises an elongated arm portion and a transverse head portion, and wherein the head portion comprises a bottom which lies on the same horizontal plane as the bottom edges of the strut members.

3. A vehicle trunk organizer for organizing items in a trunk of a vehicle, the trunk organizer comprising:
    at least two elongated, generally parallel strut members, each of which comprises a bottom edge and at least first and second longitudinal, generally parallel openings;
    at least two elongated, generally parallel cross-piece members, each of which comprises at least first and second elongated, generally parallel beam members;
    wherein each first beam member extends through the first opening in each strut member and each second beam member extends through the second opening in each strut member;
    a connector which pivotally connects each beam member to each strut member to thereby enable the trunk organizer to be collapsed from an unfolded state to a folded state;
    wherein in the unfolded state the trunk organizer comprises a generally rectangular lattice configuration which defines a number of individual compartments within which the items may be placed; and
    means for effectively extending the length of at least one of the strut members or at least one of the cross-piece members;
    wherein the extending means comprises a generally flat plate member which is slidably mounted to an end of the strut member or the cross-piece member.

4. The trunk organizer of claim 3, wherein the plate member comprises an elongated arm portion and a transverse head portion, and wherein the head portion comprises a bottom which lies on the same horizontal plane as the bottom edges of the strut members.

5. A vehicle trunk organizer for organizing items in a trunk of a vehicle, the trunk organizer comprising:
    at least two elongated, generally parallel strut members, each of which comprises a bottom edge and at least first and second horizontal stretchers which are connected together in a spaced-apart, generally parallel configuration by two transverse end joints to thereby define a first elongated opening in the strut member;
    at least two elongated, generally parallel cross-piece members, each of which comprises at least a first elongated beam member which extends through each opening and is pivotally connected to the first and second stretchers of each strut member;
    wherein the trunk organizer is collapsible from an unfolded state, in which the trunk organizer comprises a generally rectangular lattice configuration which defines a number of individual compartments within which the items may be placed, to a folded state.

6. The trunk organizer of claim 5, further comprising means for effectively extending the length of at least one of the cross-piece members.

7. The trunk organizer of claim 6, wherein the extending means comprises a generally flat plate member which is slidably mounted to an end of the cross-piece member.

8. The trunk organizer of claim 7, wherein the plate member comprises an elongated arm portion and a transverse head portion.

9. The trunk organizer of claim 8, wherein the extending means further comprises a pair of brackets, each of which is connected to the cross-piece member so as to form a channel within which a corresponding edge of the arm portion is slidably received.

10. The trunk organizer of claim 8, wherein the extending means further comprises a hand opening which is located in the head portion.

11. The trunk organizer of claim 8, wherein the extending means further comprises a stop to limit the extent the plate member can slide relative to the cross-piece member.

12. The trunk organizer of claim 8, wherein the head portion comprises a bottom which lies on the same horizontal plane as the bottom edges of the strut members.

13. The trunk organizer of claim 5, wherein each strut member comprises a third horizontal stretcher which is connected by the end joints to the second stretcher in a spaced-apart, generally parallel configuration to thereby define a second elongated opening in the strut member.

14. The trunk organizer of claim 13, wherein each cross-piece member comprises a second elongated beam member which is generally parallel to the first beam member and which extends through each second opening and is pivotally connected to the second and third stretchers of each strut member.

* * * * *